(12) United States Patent
Kim et al.

(10) Patent No.: US 8,924,016 B2
(45) Date of Patent: Dec. 30, 2014

(54) APPARATUS FOR PLANNING PATH OF ROBOT AND METHOD THEREOF

(75) Inventors: Myung Hee Kim, Suwon-si (KR); Kyung Shik Roh, Seongnam-si (KR); Young Bo Shim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 305 days.

(21) Appl. No.: 13/328,125

(22) Filed: Dec. 16, 2011

(65) Prior Publication Data

US 2012/0165982 A1 Jun. 28, 2012

(30) Foreign Application Priority Data

Dec. 27, 2010 (KR) .................. 10-2010-0135435

(51) Int. Cl.
*G01C 21/00* (2006.01)
*B25J 9/16* (2006.01)

(52) U.S. Cl.
CPC .............. *B25J 9/162* (2013.01); *B25J 9/1664* (2013.01); *G05B 2219/40244* (2013.01); *G05B 2219/40476* (2013.01); *G05B 2219/40477* (2013.01)
USPC ....................................... 700/255; 74/490.05

(58) Field of Classification Search
USPC ............ 700/255, 56, 57, 61–63, 67–69, 700/186–190, 192, 193; 901/30, 27, 19, 41; 74/490.01, 490.05; 318/567, 568.12, 318/568.16, 568.2
See application file for complete search history.

(56) References Cited

U.S. PATENT DOCUMENTS

| | | | |
|---|---|---|---|
| 6,643,563 B2 * | 11/2003 | Hosek et al. ................... | 700/245 |
| 7,693,653 B2 * | 4/2010 | Hussain et al. ............... | 701/416 |
| 7,805,220 B2 * | 9/2010 | Taylor et al. ................... | 700/253 |
| 2008/0059015 A1 * | 3/2008 | Whittaker et al. .............. | 701/23 |
| 2010/0204828 A1 * | 8/2010 | Yoshizawa et al. ........... | 700/245 |

FOREIGN PATENT DOCUMENTS

KR 10-2011-0015833 2/2011

* cited by examiner

*Primary Examiner* — Dalena Tran
(74) *Attorney, Agent, or Firm* — Staas & Halsey LLP

(57) ABSTRACT

A method for planning the robot path includes forming a shape space that includes a start point, a goal point, and obstacle information so as to generate a moving path of the robot, generating one or more moving paths of the robot within the shape space, and storing the generated moving paths in a database, selecting a specific path that has a minimum operation range of the robot and a minimum constraint caused by the obstacle from among the stored moving paths, and planning the selected path, enabling the robot to perform motion along the planned path, and pre-planning a path for a next motion of the robot while the robot performs the motion. The apparatus or method for planning the robot path can reduce a time from an end time of one motion to the start time of the next motion, thereby performing a smooth motion.

18 Claims, 6 Drawing Sheets

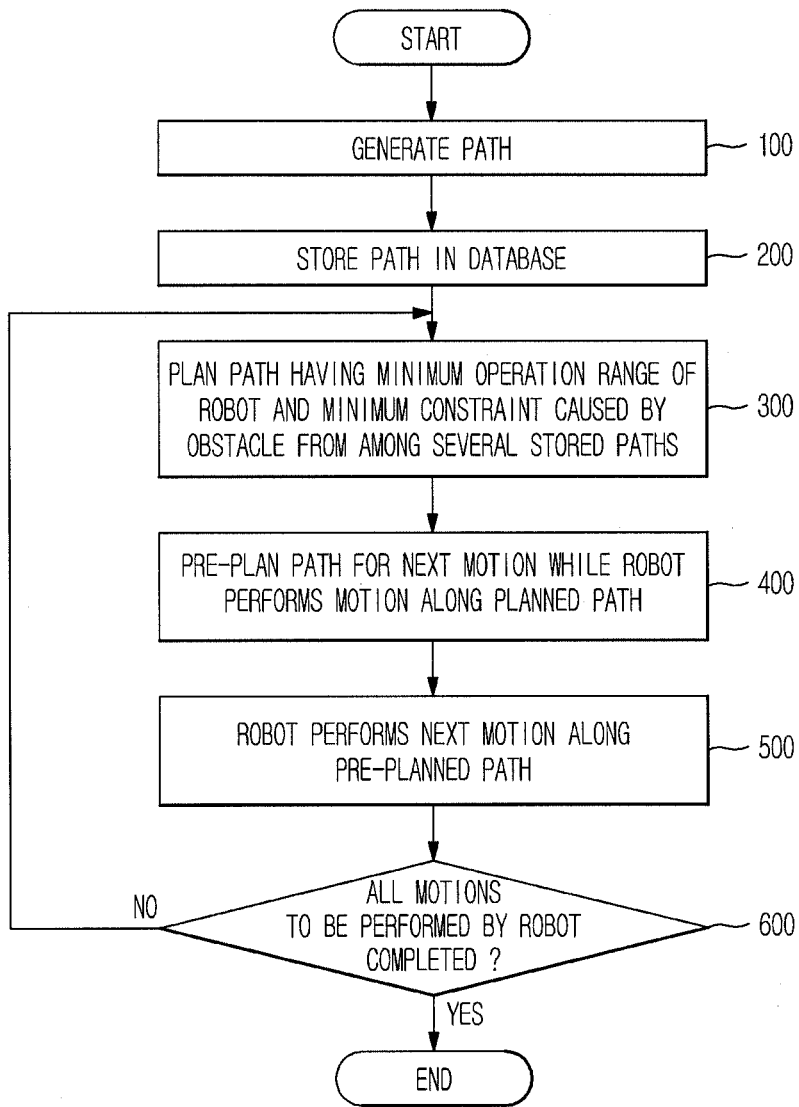

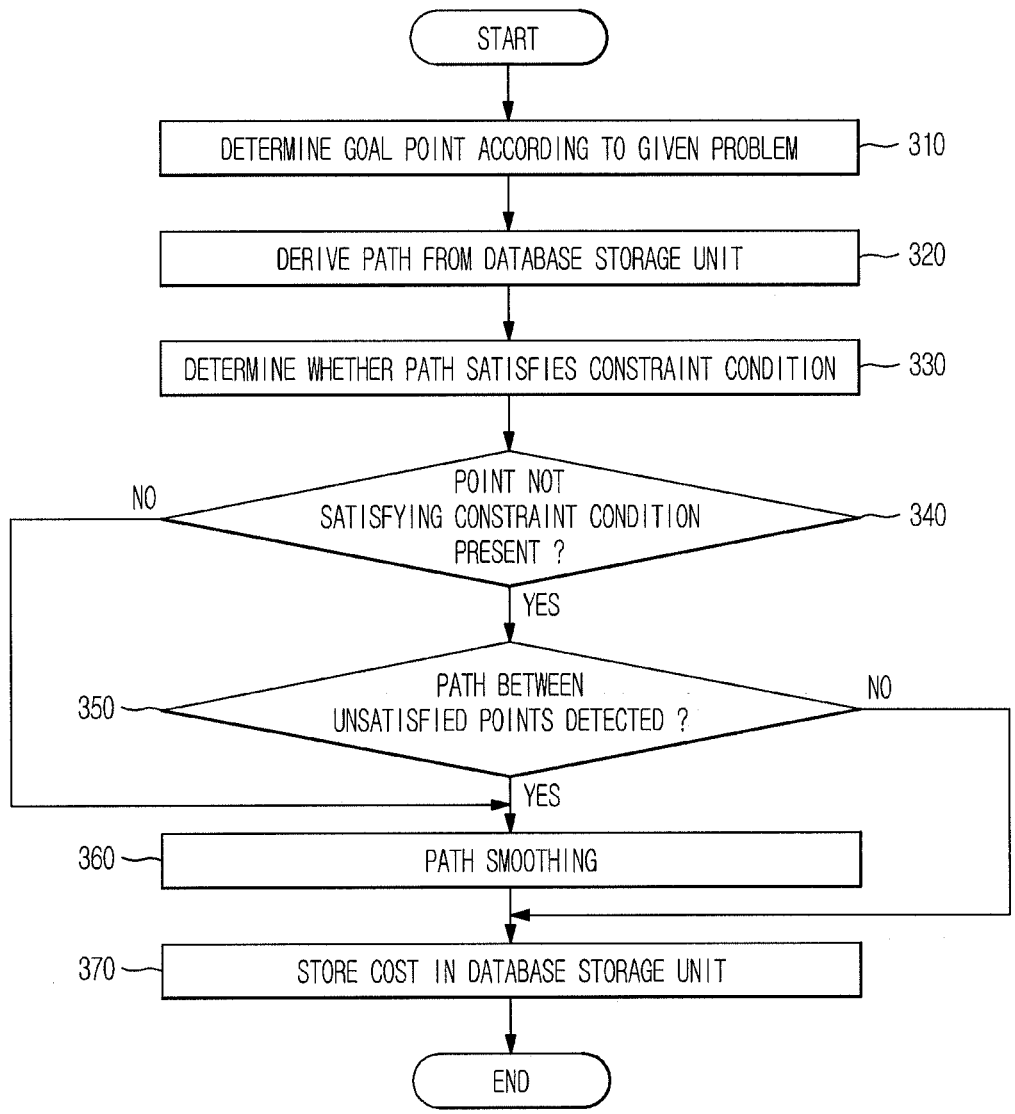

APPARATUS FOR PLANNING PATH OF ROBOT AND METHOD THEREOF

CROSS-REFERENCE TO RELATED APPLICATIONS

This application claims the priority benefit of Korean Patent Application No. 2010-0135435, filed on Dec. 27, 2010 in the Korean Intellectual Property Office, the disclosure of which is incorporated herein by reference.

BACKGROUND

1. Field

Embodiments of the present invention relate to an apparatus and method for planning a robot path so as to rapidly plan a smooth path of a robot using a parallel algorithm and a variable motion database.

2. Description of the Related Art

In general, a mechanical device which performs motion similar to human motion using an electrical or magnetic mechanism is called a robot. Most early robots served as manipulators used for automated or unmanned tasks in manufacturing plants or industrial robots such as transfer robots, such that they can perform dangerous tasks, simple and repeated tasks, and tasks requiring high power on behalf of a human being. In recent times, a humanoid robot, which has articulated joint structures similar to that of a human being, and which coexists with a human being so as to support human lives, residential living services, and human activity in other daily lives, has been developed.

The humanoid robot performs a given task using a manipulator which performs motion similar to those of arms or hands of a human being according to electrical and mechanical mechanisms. Most manipulators are configured by interconnecting a plurality of links. The connection part between individual links is called a joint, and motion characteristics of the manipulator are determined according to the geometric relationship between links and joints. A numerical expression of the above geometric relationship is called kinematics. Most manipulators move an end effector of the robot in a direction (goal point) along which a task is performed with kinematic characteristics.

In order to enable the manipulator to perform a given task (e.g., grasping an object), it is necessary to create the moving path of the manipulator from an initial position (start point) before the execution of the task to the final position (goal point) where the robot can grasp the object. There are a variety of Sampling Based Path Planning (SBPP) methods in which the manipulator satisfies a constraint condition such as collision avoidance so that the manipulator does not collide with an obstacle within an operation region. A representative example of an SBPP method is a Rapidly-exploring Random Tree (RRT) algorithm.

The RRT algorithm uses a shape that is randomly sampled within a Configuration Space (C-Space) in which the manipulator or the humanoid robot performs an operation. One example of the RRT algorithm extends the tree by repeating a process of selecting a node closest to the initial start point such that it searches for the moving path to the final goal point. The exemplary RRT algorithm selects a node having the smallest goal score from among the tree using the distance from the goal point to the end effector and a goal function composed of direction-vector functions, such that it can extend the tree.

However, the conventional RRT algorithm has to search the entire space when generating the path, such that a long period of time is needed to plan the final path. In addition, a large number of calculations are needed for implementation of high dimension, so that a long period of time is needed to plan the final path.

SUMMARY

Therefore, it is an aspect to provide an apparatus and method for planning a robot path by planning a path through a parallel algorithm and a variable motion database, thereby improving performance or throughput of the path planning.

Additional aspects will be set forth in part in the description which follows and, in part, will be obvious from the description, or may be learned by practice of the invention.

In accordance with one aspect, a method for planning a path of a robot includes forming a shape space that includes a start point, a goal point, and obstacle information so as to generate a moving path of the robot; generating one or more moving paths of the robot within the shape space, and storing the generated moving paths in a database; selecting a specific path that has a minimum operation range of the robot and a minimum constraint caused by the obstacle from among the stored moving paths, and planning the selected path; enabling the robot to perform a motion along the planned path; and pre-planning a path for a next motion of the robot while the robot performs the motion.

The start point may be a node obtained when a shape at an initial position before the robot performs motion is formed in the shape space.

The goal point may be a node obtained when a shape at a goal position where the robot performs motion is formed in the shape space.

Generating one or more moving paths of the robot within the shape space and storing the generated moving path in the database may include selecting a moving path having a minimum variation of a joint angle of the robot from among the generated one or more moving paths and storing the selected moving path.

Planning the specific path that has the minimum operation range of the robot and the minimum constraint caused by the obstacle from among the stored moving paths may include determining a point having a constraint caused by the obstacle, and planning a path at a shape point spaced apart from the determined point by a predetermined distance.

Planning the specific path that has the minimum operation range of the robot and the minimum constraint caused by the obstacle from among the stored moving paths may include generating a path at each of the start point and the goal point, and planning a firstly appearing path from among the generated paths.

The method may further include smoothing a path for a next motion of the robot while the robot performs a motion.

Smoothing the path for the next motion of the robot while the robot performs a motion may include performing smoothing of a path having a constraint caused by the obstacle in such a manner that the smoothing result is proportional to a constraint value caused by the obstacle.

The method may further include re-planning a path for a next pre-planned motion of the robot while the robot performs a motion through currently conducted robot motion and information of the obstacle.

In accordance with another aspect of the present invention, an apparatus for planning a path of a robot includes a path generator for forming a shape space that includes a start point, a goal point, and obstacle information so as to generate a moving path of the robot, and generating one or more moving paths of the robot within the shape space; a storage unit to store the moving paths generated by the path generator in a database; a first path planning unit for selecting a specific path that has a minimum operation range of the robot and a minimum constraint caused by the obstacle from among the stored moving paths, and planning the selected path; a controller for enabling the robot to perform a motion along the path planned by the first path planning unit; and a second path planning unit to pre-plan a path for a next motion of the robot while the robot performs the motion.

The storage unit may store a moving path having a minimum variation of a joint angle of the robot from among the generated one or more moving paths.

The first path planning unit may determine a point having a constraint caused by the obstacle, and plan a path at a shape point spaced apart from the determined point by a predetermined distance.

The first path planning unit may generate a path at each of the start point and the goal point, and plan a firstly appearing path from among the generated paths.

The apparatus may further include a third path planning unit to re-plan a path planned by either the first path planning unit or the second path planning unit through currently conducted robot motion and information of the obstacle.

The apparatus may further include a smoothing unit to smooth a path planned by the first path planning unit, the second path planning unit or the third path planning unit.

The smoothing unit may perform smoothing of a path having a constraint caused by the obstacle in such a manner that the smoothing result is proportional to a constraint value caused by the obstacle.

BRIEF DESCRIPTION OF THE DRAWINGS

These and/or other aspects of the invention will become apparent and more readily appreciated from the following description of the embodiments, taken in conjunction with the accompanying drawings of which:

FIG. 5 is a flowchart illustrating a process for planning the robot path according to one embodiment of the present invention.

FIG. 6 is a flowchart illustrating a process for planning an optimum robot path according to one embodiment of the present invention.

DETAILED DESCRIPTION

Figure 1:
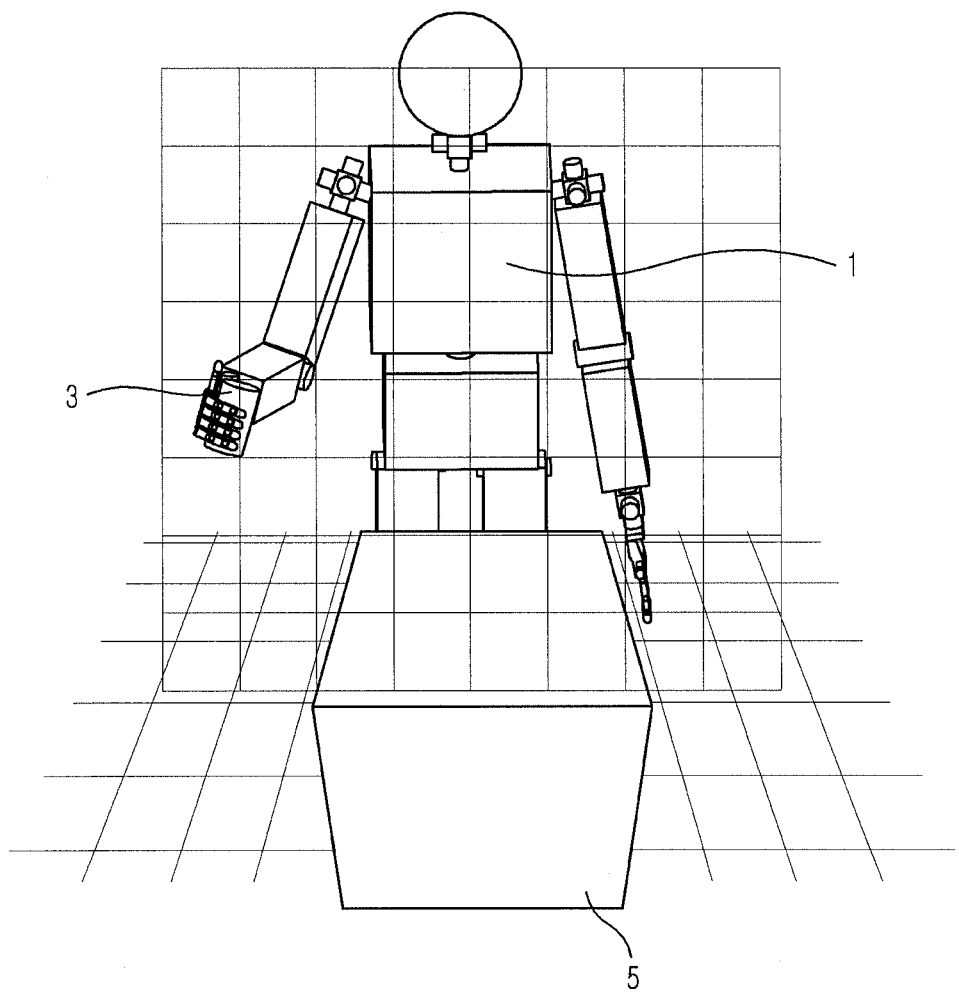
FIG. 1 is a conceptual diagram illustrating that a space is divided into lattices so as to plan a representative path of a robot according to one embodiment of the present invention.

Reference will now be made in detail to the embodiments, examples of which are illustrated in the accompanying drawings, wherein like reference numerals refer to like elements throughout.

FIG. 1 is a conceptual diagram illustrating that a space may be divided into lattices so as to plan a representative path of a robot according to one embodiment.

As the pre-processing for planning the moving path of the robot 1, the moving path of the robot 1 with respect to several representative positions of the object 3 or the table 5 may be stored in a database. In other words, the moving path of the robot may be divided into lattices, paths reaching lateral surfaces of lattices may be selected, and paths reaching the remaining lattices may be stored in a database.

Figure 2:
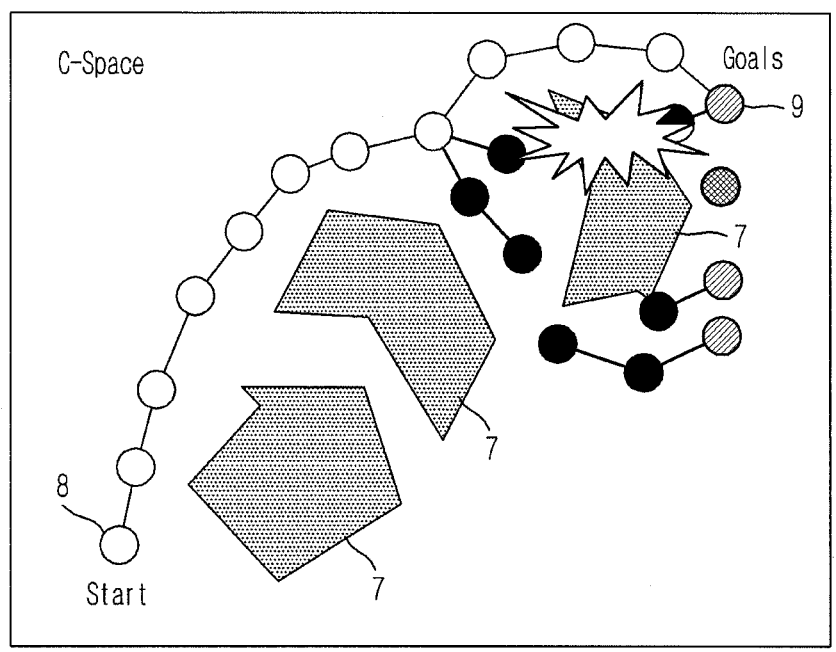
FIG. 2 is a conceptual diagram illustrating planning of the robot path according to one embodiment of the present invention.

FIG. 2 is a conceptual diagram illustrating planning of the robot path according to one embodiment of the present invention.

As described above, the RRT algorithm acting as the conventional path planning method uses a shape that is randomly sampled in the C-space. The RRT algorithm extends a tree by repeating a process of selecting a node closest to the start point 8, such that it searches for the moving path to the target point 9. In accordance with one exemplary RRT algorithm, the RRT algorithm selects a node having the smallest goal score from among the tree using not only the distance from the goal point 9 to the end effector but also a goal function composed of direction-vector functions, thereby extending the tree.

In contrast, the robot path planning method according to one embodiment may record a specific part where a constraint condition (for example, a part colliding with the obstacle 7 shown in FIG. 2) is not satisfied, and may interconnect both end points where the constraint condition is not satisfied.

In this case, there is a high possibility that a condition such as an obstacle is present in the vicinity of the constraint condition, such that a point spaced apart from another point where the constraint condition is not satisfied by a predetermined distance is selected so that path planning is achieved.

In addition, such a path planning may be conducted in parallel. That is, each path planning process may be performed at the start point 8 and each goal point 9. During the path planning, the fastest path may be selected.

That is, the path planning process according to one embodiment of the present invention may select points not satisfying the constraint condition caused by the obstacle 7, may exclude a path formed by interconnecting the remaining parts, may select a path formed in the remaining region, thereby implementing path planning, whereas the conventional path planning process according to the related art has made a path from the beginning.

Referring to FIG. 2, nodes close to the start point 8 may be selected to form a path, and nodes close to the goal point 9 may be selected to form a path. If a constraint caused by the obstacle 7 occurs on each path, the corresponding point may be recorded, and the path formed on the recorded point may not be reflected in the path planning (denoted by a bold line). Therefore, if there is a node at which one path starting from the start point 8 meets the other path starting from the goal point 9, a path interconnecting the two paths may be determined to be a final planning path (denoted by a light line).

By the above-mentioned description, the path planning time can be reduced than that of the path planning through the conventional RRT algorithm.

Figure 3:
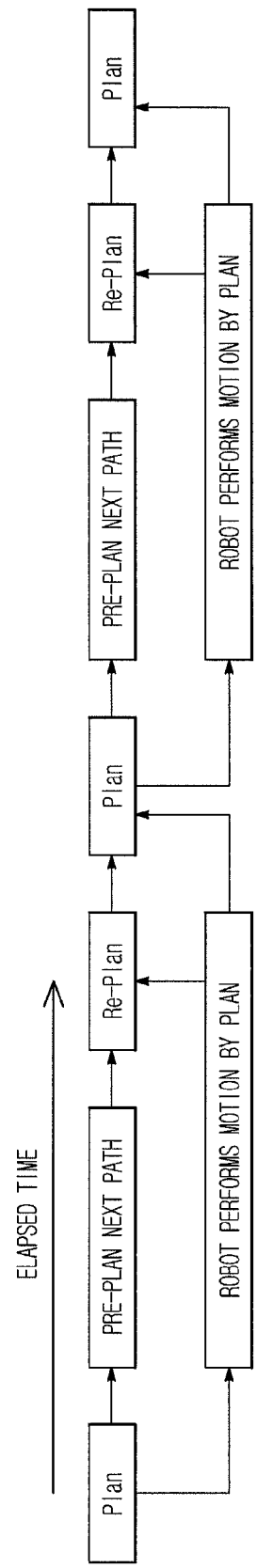
FIG. 3 is a conceptual diagram illustrating planning of the robot path being changed with time according to one embodiment of the present invention.

FIG. 3 is a conceptual diagram illustrating planning of the robot path being changed with time according to one embodiment of the present invention.

In accordance with the related art, after each path plan for each motion of the robot 1 is performed, the motion of the robot 1 is performed. On the contrary, the path planning process according to one embodiment of the present invention plans a path for one motion, and performs the motion of the robot 1 according to the planed path. While the motion of the robot 1 is performed, the path of the next motion is planned. That is, when the robot 1 performs motion, the path is pre-planed, so that the path planning time consumed for the robot 1's motion can be reduced.

Referring to FIG. 3, the path for performing the robot 1's motion may be planned according to the elapsed time, and the robot 1 performs the corresponding motion. While the robot 1 performs motion, it pre-plans the path corresponding to the next motion.

In addition, with respect to the pre-planned path during the robot 1's motion, the re-planning may be performed on the basis of the position of the motion being currently performed by the robot 1 and information of obstacle 7 related to the position. The re-planning can further supplement the pre-planned path. In more detail, the re-planning may reflect the motion state of the robot 1 so that it can more correctly plan the path corresponding to the next motion.

Figure 4:
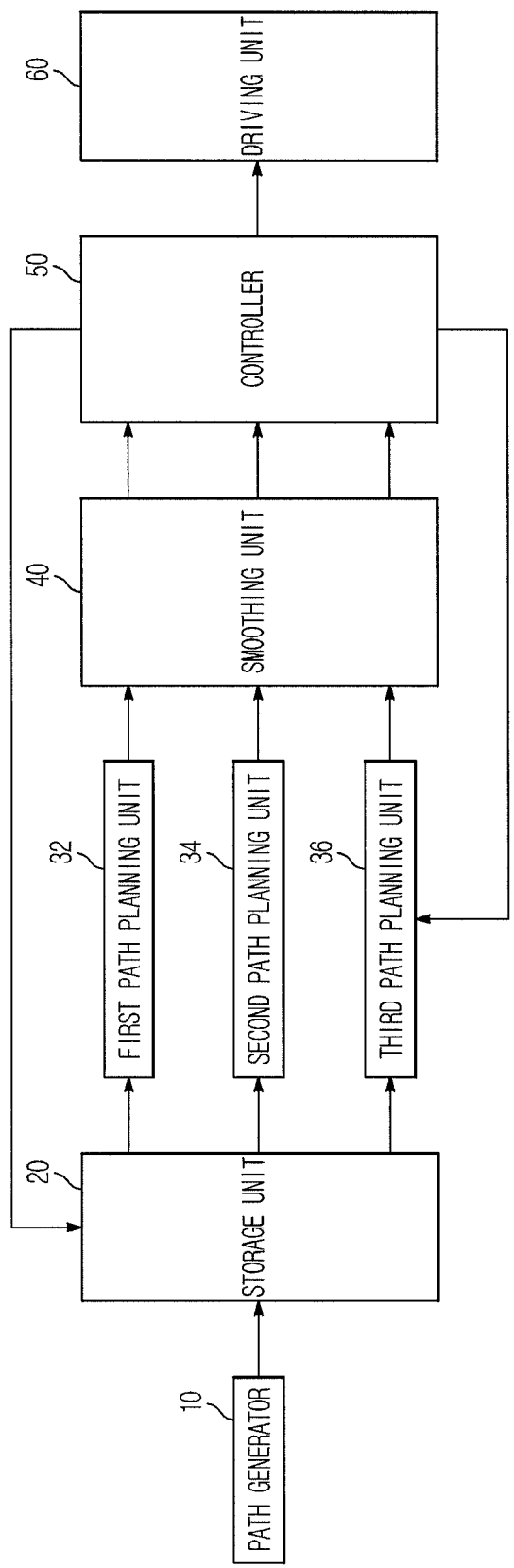
FIG. 4 is a block diagram illustrating a process for planning the robot path according to another embodiment of the present invention.

FIG. 4 is a block diagram illustrating a process for planning the robot path according to another embodiment of the present invention.

Referring to FIG. 4, the robot 1 may include a path generator 10, a storage unit 20, a first path planning unit 32, a second path planning unit 34, a third path planning unit 36, a smoothing unit 40, a controller 50, and a driving unit 60.

The path generator 10 may create a representative path generated in the same space as in FIG. 1.

The storage unit 20 may receive a path created by the path generator 10 or a path planned by the first path planning unit 32, the second path planning unit 34, and the third path planning unit 36 from the controller 50, and may store the received path in the database.

The storage unit 20 may initially store the path created by the path generator 10. In this case, the storage unit 20 may selectively store the created path. That is, the path cost may be calculated such that one path having low costs according to the calculated result is selected and stored in the storage unit 20.

In this case, the cost of path may be calculated on the basis of a variation of a joint angle of each part forming the robot 1, and one path having a small variation of the joint angle may be selected and stored. The first path planning unit 32 may select an optimum path from among a plurality of paths stored in the storage unit 20.

The optimum path selection may select a path having a small difference between the initial posture of the robot 1 and the final posture of the robot 1, calculate the sum of nodes that do not satisfy the constraint condition caused by the obstacle 7 with respect to each selected path, and select a path having a minimum sum of nodes.

In addition, the first path planning unit 32 may memorize a point where the constraint condition is not satisfied, and interconnect both points not satisfying the constraint condition. In this case, there is a high possibility that the obstacle 7 is present in the vicinity of a point having a constraint condition, such that a point spaced apart from the point not satisfying the constraint condition by a predetermined distance may be selected, thereby planning the path.

In addition, the first path planning unit 32 may perform the path planning not only at the start point 8 but also the goal point 9. The path planning operations may be simultaneously performed at several goal points in parallel. In the process for performing path planning in parallel, the fastest path may be determined to be a planning path.

The first path planning unit 32 may select a point not satisfying the constraint condition in a different way from the related art that has conventionally been configured to make the path from the beginning, and may interconnect the remaining part in such a manner that the path planning is achieved.

The second path planning unit 34 may pre-plan a path about the next motion from among several motions of the robot 1 that moves along the planned path, and may store the pre-planned path in the storage unit 20. As a result, the path planning time consumed for the robot 1's motion may be reduced.

That is, the last information (i.e., the position and posture of the robot 1 and the position and shape of the obstacle 7) of the first-planned path may be used as an initial condition of the pre-planned path, and the path about the next robot 1's motion may be planned while the robot 1 moves along the initially planned path.

The second path planning unit 34 may repeat the above-mentioned processes according to the number of motions of the robot 1.

The third path planning unit 36 may perform re-planning of the pre-planned path on the basis of a current motion position of the robot 1 and information of the obstacle 7 related to the motion position while the robot 1 performs the motion. The above-mentioned process may be adapted to further supplement the pre-planned path, the motion state of the robot 1 may be reflected so that the path corresponding to the next motion can be more correctly planned.

The smoothing unit 40 may perform the smoothing process about the planned path obtained from any one of the first path planning unit 32, the second path planning unit 34 or the third path planning unit 36.

In addition, the smoothing unit 40 may smooth the planned path obtained from the first path planning unit 32, and may execute a path planned by the second path planning unit 34 or a path planned by the third path planning unit 36 while the robot 1 performs motion along the path planned by the first path planning unit 32.

In addition, the smoothing unit 40 may smooth the path while the robot 1 performs motion along the path planned by the first path planning unit 32, resulting in a reduced smoothing time.

In addition, the smoothing unit 40 may concentratedly perform the smoothing in the vicinity of a point having a constraint point caused by the detected obstacle 7 during the path planning. In general, the path variation is very large at the point having the constraint condition, so that it is necessary to perform a more effective smoothing process in consideration of such large path variation.

In addition, the smoothing unit 40 may perform the smoothing operation in proportion to the number of parts not satisfying the constraint condition.

The controller 50 may receive an output signal of the first path planning unit 32, an output signal of the second path planning unit 34, an output signal of the third path planning unit 36, and an output signal of the smoothing unit 40, so that it may control the driving unit 60 in such a manner that the robot 1 can perform the motion.

In addition, the controller 50 may transmit output path data of the first path planning unit 32, output path data of the second path planning unit 34, output path data of the third path planning unit 36, and output path data of the smoothing unit 40 to the storage unit 20, and may store them in the storage unit 20.

In addition, the controller 50 may calculate the cost of the output path data of the first path planning unit 32, the cost of the output path data of the second path planning unit 34, the cost of the output path data of the third path planning unit 36, and the cost of the output path data of the smoothing unit 40. If the calculated cost is less than that of the conventional motion, the controller 20 may transmit it to the storage unit 20 so that the calculated cost may be stored in a database. If the stored cost value is higher than that of the conventional motion, the controller 50 may not transmit the corresponding cost value to the storage unit 20.

FIG. 5 is a flowchart illustrating a process for planning the robot path according to one embodiment of the present invention.

Referring to FIG. 5, one or more paths may be created at operation 100. As described above, the moving space of the robot 1 is divided into lattices, and a representative path may be created on the basis of the object 3 or the table 5.

Next, the created paths may be stored in the database at operation 200. In this case, the path to be stored in the database from among the created paths may be determined on the basis of the cost of each created path. For example, the path cost may be calculated according to the joint angle of the robot 1. If the joint angle is small, this means that the path cost is small.

Subsequently, a specific path that has a minimum operation range of the robot 1 and a minimum constraint caused by the obstacle 7 may be planned at operation 300.

Provided that the robot 1 has a minimum operation range, this means that there is a small difference between the initial posture and the final posture of the robot 1. Provided that the robot has minimum constraint caused by the obstacle 7, this means that the motion of the robot 1 moving along a path is not restricted (e.g., the robot 1 may collide with the obstacle 7).

The path having both the minimum operation range of the robot 1 and minimum constraint caused by the obstacle 7 may be planned, so that the path planning may be achieved in minimal time.

The path for the next motion may be pre-planned while the robot 1 performs motion along the planned path at operation 400.

In order to reduce a time consumed for the path planning of the robot 1, the path corresponding to the next motion may be planned while the current robot 1 performs one motion. As a result, the path about the next motion may be planned without additional time.

Subsequently, the robot 1 may perform the next motion along the pre-planned path at operation 500.

Since the path about the next motion may be pre-planned while the robot 1 performs the previous motion, a time delay encountered after the execution of the previous motion may be minimized and at the same time the next motion is performed.

The controller may determine whether all the motions to be conducted by the robot have been completed at operation 600.

If all the motions to be conducted by the robot 1 have not been completed, the controller may pre-plan the path about the next motion while the robot 1 performs motion at operation 300.

FIG. 6 is a flowchart illustrating a process for planning an optimum robot path according to one embodiment of the present invention.

FIG. 6 is a flowchart illustrating detailed steps of the operation 300 shown in FIG. 5.

Referring to FIG. 6, a goal point may be decided according to a task given to the robot 1 at operation 310.

The path stored may be derived from the database storage unit at operation 320. As described above, the path having low costs may be selected and derived from the database storage unit.

It may be determined whether the derived path satisfies the constraint condition at operation 330.

It may be determined whether the point not satisfying the constraint condition is present at operation 340. If the point not satisfying the constraint condition is present at operation 340, it may be determined whether the path can be planned between points not satisfying the constraint condition at operation 350.

If the points not satisfying the constraint condition are not present, this means that path planning can be achieved without any restriction, so that the process for smoothing the planned path may be performed at operation 360.

If the path between points not satisfying the constraint condition is detected at operation 350, the detected path may be smoothed at operation 360. Although the path is not detected, if the cost requisite for the detected point is less than the cost stored in the database, the corresponding cost may be stored and used for the next path planning at operation 370.

Through the robot path planning process according to one embodiment, the reduction of the execution time of the robot 1's motion is illustrated, for example, by the following Table 1.

TABLE 1

| Planning Method | Node Num | Time (Sec) | Smoothing Time |
|---|---|---|---|
| Bi-RRT | 1205.857 | 6.3768 | 1.235857 |
| MG-RRT | 1100.5714 | 4.233 | 1.1305714 |
| RA* | 900.857 | 2.3768 | 0.930857 |
| MG-RRT Using MotionDB | 112.5714 | 0.2 | 0.1425714 |

In this case, 'Bi-RRT', 'MG-RRT' or 'RA*' indicates the conventional path planning algorithm, and MG-RRT Using MotionDB indicates the robot path planning method according to one embodiment of the present invention.

As is apparent from the above description, the apparatus and method for planning a robot path according to embodiments of the present invention can reduce a time from an end time of one motion to the start time of the next motion, thereby forming a smooth motion.

Although a few embodiments of the present invention have been shown and described, it would be appreciated by those skilled in the art that changes may be made in these embodiments without departing from the principles and spirit of the invention, the scope of which is defined in the claims and their equivalents.

The methods according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like.

Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa. Any one or more of the software modules described herein may be executed by a dedicated processor unique to that unit or by a processor common to one or more of the modules. The described methods may be executed on a general purpose computer or processor or may be executed on a particular machine such as the image processing apparatus described herein.

What is claimed is:

1. A method for planning a path of a robot comprising:
   forming by a processor a shape space that includes a start point, a goal point, and obstacle information so as to generate a moving path of the robot;
   generating by a processor one or more moving paths of the robot within the shape space, and storing the generated moving paths in a database;
   selecting a specific path that has a minimum operation range of the robot and a minimum constraint caused by the obstacle from among the stored moving paths, and planning the selected path;
   enabling the robot to perform a first motion along the planned path; and
   pre-planning a path for a second motion of the robot while the robot performs the motion,
   wherein the planning the specific path that has the minimum operation range of the robot and the minimum constraint caused by the obstacle from among the stored moving paths comprises generating a first path from the start point toward the goal point and a second path from the goal point toward the start point and planning a path that is generated to be a fastest path among the first path and the second path.

2. The method according to claim 1, wherein the start point is a node obtained when a shape at an initial position before the robot performs the first motion is formed in the shape space.

3. The method according to claim 1, wherein the goal point is a node obtained when a shape at a goal position where the robot performs a motion is formed in the shape space.

4. The method according to claim 1, wherein the generating one or more moving paths of the robot within the shape space and the storing the generated moving path in the database comprise:
   selecting a moving path having a minimum variation of a joint angle of the robot from among the generated one or more moving paths and storing the selected moving path.

5. The method according to claim 4, wherein the planning the specific path that has the minimum operation range of the robot and the minimum constraint caused by the obstacle from among the stored moving paths comprises:
   determining a point having a constraint caused by the obstacle, and planning a path at a shape point spaced apart from the determined point by a predetermined distance.

6. The method according to claim 1, further comprising smoothing a path for the second motion of the robot while the robot performs the first motion.

7. The method according to claim 6, wherein the smoothing the path for the second motion of the robot while the robot performs motion comprises:
   performing smoothing of a path having a constraint caused by the obstacle in such a manner that the smoothing result is proportional to a constraint value caused by the obstacle.

8. The method according to claim 1, further comprising:
   re-planning a path for the second pre-planned motion of the robot while the robot performs the first motion, the re-planning using the first motion and information of the obstacle.

9. A non-transitory, computer-readable storage medium storing a program instructing a computer to execute the method of claim 1.

10. An apparatus for planning a path of a robot comprising:
    a path generator to form a shape space that includes a start point, a goal point, and obstacle information so as to generate a moving path of the robot, and to generate one or more moving paths of the robot within the shape space;
    a storage unit to store the moving paths generated by the path generator in a database;
    a first path planning unit to select a specific path that has a minimum operation range of the robot and a minimum constraint caused by the obstacle from among the stored moving paths, and to plan the selected path;
    a controller to enable the robot to perform a first motion along the path planned by the first path planning unit; and
    a second path planning unit to pre-plan a path for a second motion of the robot while the robot performs the first motion,
    wherein the planning the specific path that has the minimum operation range of the robot and the minimum constraint caused by the obstacle from among the stored moving paths comprises generating a first path from the start point toward the goal point and a second path from the goal point toward the start point and planning a path that is generated to be a fastest path among the first path and the second path.

11. The apparatus according to claim 10, wherein the storage unit stores a moving path having a minimum variation of a joint angle of the robot from among the generated one or more moving paths.

12. The apparatus according to claim 11, wherein the first path planning unit determines a point having a constraint caused by the obstacle, and plans a path at a shape point spaced apart from the determined point by a predetermined distance.

13. The apparatus according to claim 10, further comprising:
    a third path planning unit to re-plan a path planned by either the first path planning unit or the second path planning unit using the first or second motion and information of the obstacle.

14. The apparatus according to claim 13, further comprising:
    a smoothing unit to smooth a path planned by the first path planning unit, the second path planning unit or the third path planning unit.

15. The apparatus according to claim 14, wherein the smoothing unit performs smoothing of a path having a constraint caused by the obstacle in such a manner that the smoothing result is proportional to a constraint value caused by the obstacle.

16. A method for planning a path of a robot comprising:
    forming by a processor a shape space that includes a start point, a goal point, and obstacle information so as to generate a moving path of the robot, the start point being obtained when a shape at an initial position before the robot performs the first motion is formed in the shape space and the goal point being obtained when a shape at a goal position where the robot performs a motion is formed in the shape space;

generating by a processor one or more moving paths of the robot within the shape space, and storing the generated moving paths in a database, the generating comprising generating a first path from the start point toward the goal point and a second path from the goal point toward the start point, and planning a path that is generated to be a fastest path among the first path and the second path;

selecting a specific path that has a minimum operation range of the robot and a minimum constraint caused by the obstacle from among the stored moving paths, and planning the selected path;

enabling the robot to perform a first motion along the planned path; and pre-planning a path for a second motion of the robot while the robot performs the motion.

17. The method according to claim 16, further comprising smoothing a path for the second motion of the robot while the robot performs the first motion.

18. The method according to claim 16, further comprising:

re-planning a path for the second pre-planned motion of the robot while the robot performs the first motion, the re-planning using the first motion and information of the obstacle.

* * * * *